United States Patent
Belcher et al.

(10) Patent No.: US 6,892,054 B2
(45) Date of Patent: May 10, 2005

(54) INTERFERENCE SUPPRESSION FOR WIRELESS LOCAL AREA NETWORK AND LOCATION SYSTEM

(75) Inventors: Donald K. Belcher, Rogersville, TN (US); Robert W. Boyd, Rogersville, TN (US); Michael A. Wohl, Rogersville, TN (US)

(73) Assignee: WhereNet Corp, Santa Clara, CA (US)

( * ) Notice: Subject to any disclaimer, the term of this patent is extended or adjusted under 35 U.S.C. 154(b) by 402 days.

(21) Appl. No.: 10/033,529

(22) Filed: Dec. 28, 2001

(65) Prior Publication Data

US 2002/0086640 A1 Jul. 4, 2002

Related U.S. Application Data

(60) Provisional application No. 60/259,013, filed on Dec. 29, 2000.

(51) Int. Cl.[7] .............................. H04B 1/10; H04B 15/00
(52) U.S. Cl. ................ 455/63.1; 455/67.11; 455/67.13; 455/501; 455/570; 455/506; 455/562.1; 455/553.1; 455/277.2; 455/278.1; 455/101; 455/456.1; 455/456.5; 375/130; 375/141; 370/335; 370/342; 342/375; 342/368; 342/372; 342/373
(58) Field of Search ........................... 455/63.1, 67.11, 455/67.13, 501, 570, 506, 562.1, 553.1, 277.2, 278.1, 101, 456.1, 456.5

(56) References Cited

U.S. PATENT DOCUMENTS

| | | | |
|---|---|---|---|
| 4,220,923 A | 9/1980 | Pelchat et al. | 455/295 |
| 4,608,569 A | 8/1986 | Dickey, Jr. et al. | 343/384 |
| 4,931,977 A | 6/1990 | Klemes | 364/581 |
| 5,393,965 A | 2/1995 | Bravman et al. | 235/383 |
| 5,418,812 A | 5/1995 | Reyes et al. | 375/1 |
| 5,493,307 A | 2/1996 | Tsujimoto | 342/380 |
| 5,528,621 A | 6/1996 | Heiman et al. | 375/200 |
| 5,536,930 A | 7/1996 | Barkan et al. | 235/472 |
| 5,646,389 A | 7/1997 | Bravman et al. | 235/385 |
| 5,768,140 A | 6/1998 | Swartz et al. | 364/478.13 |
| 5,768,531 A | 6/1998 | Lin | 395/200.72 |
| 5,802,101 A | 9/1998 | Maruyama | 375/206 |
| 5,812,589 A | 9/1998 | Sealander et al. | 375/200 |
| 5,818,517 A | 10/1998 | Hudson et al. | 348/21 |
| 5,850,187 A | 12/1998 | Carrender et al. | 340/825.54 |
| 5,920,287 A | 7/1999 | Belcher et al. | 342/450 |
| 5,923,702 A | 7/1999 | Brenner et al. | 375/202 |
| 5,995,046 A | 11/1999 | Belcher et al. | 342/450 |
| 6,031,863 A | 2/2000 | Jusa et al. | 375/202 |
| 6,121,926 A | 9/2000 | Belcher et al. | 342/450 |
| 6,127,976 A | 10/2000 | Boyd et al. | 342/463 |
| 6,128,549 A | 10/2000 | Swartz et al. | 700/225 |
| 6,236,365 B1 | 5/2001 | LeBlanc et al. | 342/457 |
| 6,268,723 B1 | 7/2001 | Hash et al. | 324/243 |
| 6,289,062 B1 * | 9/2001 | Wang et al. | 375/346 |
| 6,351,237 B1 * | 2/2002 | Martek et al. | 342/361 |
| 6,385,181 B1 * | 5/2002 | Tsutsui et al. | 370/335 |
| 6,438,389 B1 * | 8/2002 | Sandhu et al. | 455/562.1 |

* cited by examiner

Primary Examiner—Marceau Milord
(74) Attorney, Agent, or Firm—Allen, Dyer, Doppelt, Milbrath & Gilchrist, P.A.

(57) ABSTRACT

A wireless local area network and location system for locating objects within a monitored environment are disclosed. A plurality of access point stations receive and transmit communication signals within a wireless local area network. A processor is operatively connected to each of the access point stations and operative for processing communication signals received from the mobile station and, in one embodiment, determining which communication signals are first-to-arrive signals and conducting differentiation of the first-to-arrive signals to locate a mobile station. Delayed versions of at least one interference signal are weighted and the amplitude and phase controlled with weighted functions $W_1, W_2 \ldots W_n$. The resultant weighted replicas are summed to determine an approximation of disbursed interference for cancelling interference. The location system can include a tag transmitter and spaced monitoring receivers and processor.

35 Claims, 10 Drawing Sheets

INTERFERENCE SUPPRESSION FOR WIRELESS LOCAL AREA NETWORK AND LOCATION SYSTEM

RELATED APPLICATION

This application is based upon prior filed copending provisional application Ser. No. 60/259,013, filed Dec. 29, 2000.

FIELD OF THE INVENTION

This invention relates to the field of wireless local area networks (WLAN), and more particularly, this invention relates to wireless local area networks that provide mobile device location and a location system for locating objects within a monitored environment.

BACKGROUND OF THE INVENTION

Wireless local area networks (WLAN) and real time location systems (RTLS) are becoming more commonplace as the use of portable computers, such as "laptop," "notebook," and "pen" computers become increasingly common in office environments and other locations. Examples of real time location systems and the circuitry and algorithms used in such real time location systems are described in U.S. Pat. Nos. 5,920,287; 5,995,046; 6,121,926; and 6,127,976, the disclosures which are hereby incorporated by reference in their entirety. Examples of a real time location system that is operative with a wireless local area network are disclosed in commonly assigned copending utility patent application Ser. No. 09/997,282, filed Nov. 29, 2001, and copending utility patent application Ser. No. 10/023,481, entitled "Wireless Local Area Network System with Mobile Access Point Station Determination," filed Dec. 17, 2001, the disclosures which are hereby incorporated by reference in their entirety.

In many of these types of systems, the amount of signal interference continues to increase to the point that some of the communication systems lose their effectiveness. There are some techniques that mitigate these effects, such as the use of spread spectrum and altenna diversity, as disclosed in the above identified patents and applications. In any event, if the wireless and real time location networks increase in number, the spread spectrum and diversity techniques are not sufficiently effective.

In the wireless environment, such as a wireless local area network and real time location system, the environment is crowded with a number of communication signals and other interfering signals that occupy the same frequency bands or channels. Also, the environment is typically contaminated by multipath reflections from both the desired communication signal emanating from a desired transmitter, such as a mobile device, TAG, or mobile access point, and interfering signals emanating from interfering sources, such as other networks and antennae. Reflections can occur by wave reflecting services, including walls, buildings, other antenna, natural earth landmarks and other reflecting sources known to those skilled in the art.

SUMMARY OF THE INVENTION

It is therefore an object of the present invention to provide a wireless local area network and location system that suppresses interference of unwanted signals.

The present invention advantageously uses phase-temporal interference processing (PTIP) for interference suppression. Because of the increased speed of digital devices and communication circuits, it is possible to digitize fast enough to manage both phase and multipath delays. For example, within the 2.4 GHz unlicensed ISM band, the wavelength is less than five inches, representing a peak-to-peak time of approximately 0.4 nanoseconds. It is possible to use the present invention with a two-channel system or any other number of channels to enhance performance.

In accordance with the present invention, a wireless local area network includes a plurality of access point stations that receive and transmit communication systems. A processor is operatively connected to each of the access point stations to process communication signals received from a mobile station in communication therewith. A processor weighs delayed versions of at least one interference signal by controlling amplitude and phase with weighting functions $W_1, W_2 \ldots W_n$ and summing any resultant weighted replicas to determine an approximation of the disbursed interference for cancelling interference. An interference detector and controller provides a control loop for minimizing the total amount of interference.

A system antenna and interference receiving antenna are included. The interference receiving antenna can be a high gain antenna and directed for receiving an interference signal under high gain. The system antenna can include two system antennas spaced in diversity. The mobile station could include a mobile access point station that receives and transmits communication signals within the wireless local area network or a mobile device, such as a tag transmitter associated with an object.

In one aspect of the invention, a tapped delay line, summer, controller and interference detector circuit are operatively connected to the system and interference receiving antenna for weighting the delayed versions of at least one interference signal by controlling the amplitude and phase with the weighting functions and summing any resultant weighted replicas to determine the disbursed interference.

In yet another aspect of the present invention, a mobile station is in communication with the plurality of access point stations. A processor is operatively connected to each of the access point stations and operative for processing communication signals received from the mobile station and determining which communication signals are first-to-arrive signals and conducting differentiation of the first-to-arrive signals to locate a mobile station. A processor can be positioned at each access point station for determining first-to-arrive signals. A processor can receive any determined first-to-arrive signals from each access point station and conduct differentiation of the first-to-arrive signals. The processor can be operative for determining first-to-arrive signals based on a common timing signal.

In yet another aspect of the present invention, a location system locates objects within a monitored environment. The location system includes a tag transmitter associated with each object within the monitored environment and operative to transmit a signal encoded with information representative of the identification of the object. A plurality of spaced monitoring receivers receives signals from tag transmitters. A processor is operative with each of the spaced monitoring receivers and processes signals received from tagged transmitters for determining which signals are first-to-arrive signals and conducting differentiation of the first-to-arrive signals to locate an object and associated tag.

A processor weighs delayed versions of at least one interference signal by controlling amplitude and phase with weighting functions $W_1, W_2 \ldots W_n$ and summing any resultant weighted replicas to determine an approximation of the disbursed interference for cancelling interference. The processor can be operative for determining which signals are first-to-arrive signals based on a common timing signal. An interference detector and controller circuit can provide a control loop to minimize the interference. A system antenna and interference receiving antenna can be included. Two system antennas can be spaced in diversity. A processor can be positioned at each monitoring receiver for determining first-to-arrive signals, A location processor can receive any determined first-to-arrive signals from each monitoring receiver and conduct differentiation of the first-to-arrive signals.

In yet another aspect of the present invention, the spaced monitoring receivers further comprise a system antenna and interference receiving antenna. A tapped delayed line, summer, controller and interference detector circuit are operatively connected to the system antenna and interference receiving antenna for weighting delayed versions of at least one interference signal by controlling amplitude and phase with weighting functions $W_1, W_2 \ldots W_n$ and summing any resultant weighted replicas to determine an approximation of the disbursed interference for cancelling interference.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides a wireless local area network and a location system for locating objects in a monitored environment having a reduced and suppressed interference. The present invention is an interference reduction system that is applicable in a wireless local area network and real time location systems used with tagged transmitters. It is applicable in a wireless local area network with access point stations that locate a mobile station, TAG, or mobile access point station. Examples of such systems potentially operative with the present invention are disclosed in the incorporated by reference U.S. Pat. Nos. 5,920,287; 5,995,046; 6,121,926; and 6,127,976. A wireless local area network with real time location system capability are disclosed in commonly assigned, copending utility application Ser. No. 09/997,282, filed Nov. 29, 2001, and copending utility patent application Ser. No. 10/023,481, filed Dec. 17, 2001, entitled "Wireless Local Area Network System with Mobile Access Point System Determination."

These wireless local area network and real time location systems as described can use two antennas for diversity reception. The present invention can capitalize on a multichannel receiver and process the signal environment and provide substantial signal-to-interference improvement. In the present invention, a phase-temporal interference processing (PTIP) system allows interference suppression. With faster digital switching and higher technology systems now available, the present invention can digitize fast enough to manage phase and multipath delays at smaller wavelengths. For example, at 2.4 GHz in the common unlicensed ISM band, the wavelength is less than five inches, representing a peak-to-peak time of approximately 0.4 nanoseconds. Although the present invention is explained relative to a two-channel system, the present invention is not limited to two channels and can be used with any number of received channels to enhance performance.

As is known to those skilled in the art, when a signal is transmitted in a multipath dominated environment, reflections create copies of the signal, arriving disbursed in time-of-arrival (TOA) and disbursed in direction-of-arrival (DOA). The signal paths to two receive antennas are different (uncorrelated) when two receive antennas are separated by a few wavelengths. In the illustrated examples, it is possible to use a five wavelength separation, although the actual value chosen for the separation distance is sometimes subjectively chosen by those skilled in the art.

Figure 2:
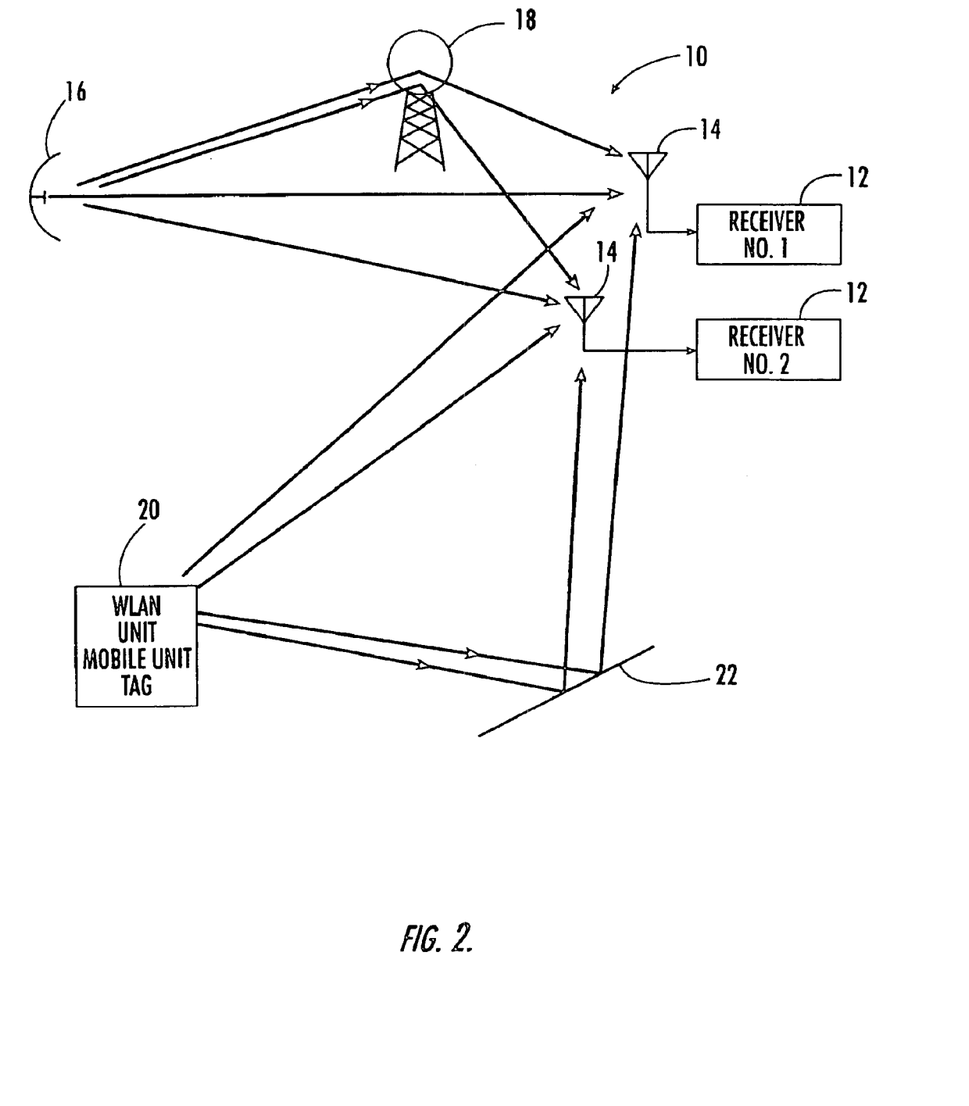
FIG. 2 is a system diagram showing receivers having spaced antenna for receiving uncorrelated versions of a desired signal and uncorrelated versions of interference.

FIG. 2 illustrates a typical prior art wireless system 10 having two receivers 12 with associated system antenna 14, a source of interference 16, a water tower 18 as a signal reflecting source, a transmitter 20, such as a TAG transmitter or wireless local area network unit (for example an access point station), and another reflecting source 22, which could be a manmade or natural reflecting choice. The desired signal and interference signal travel to the receive antennas by different paths and the reflection paths are also different. It is evident that no desired signal or interference signal is correlated with any other desired signal or interference.

Figure 3:
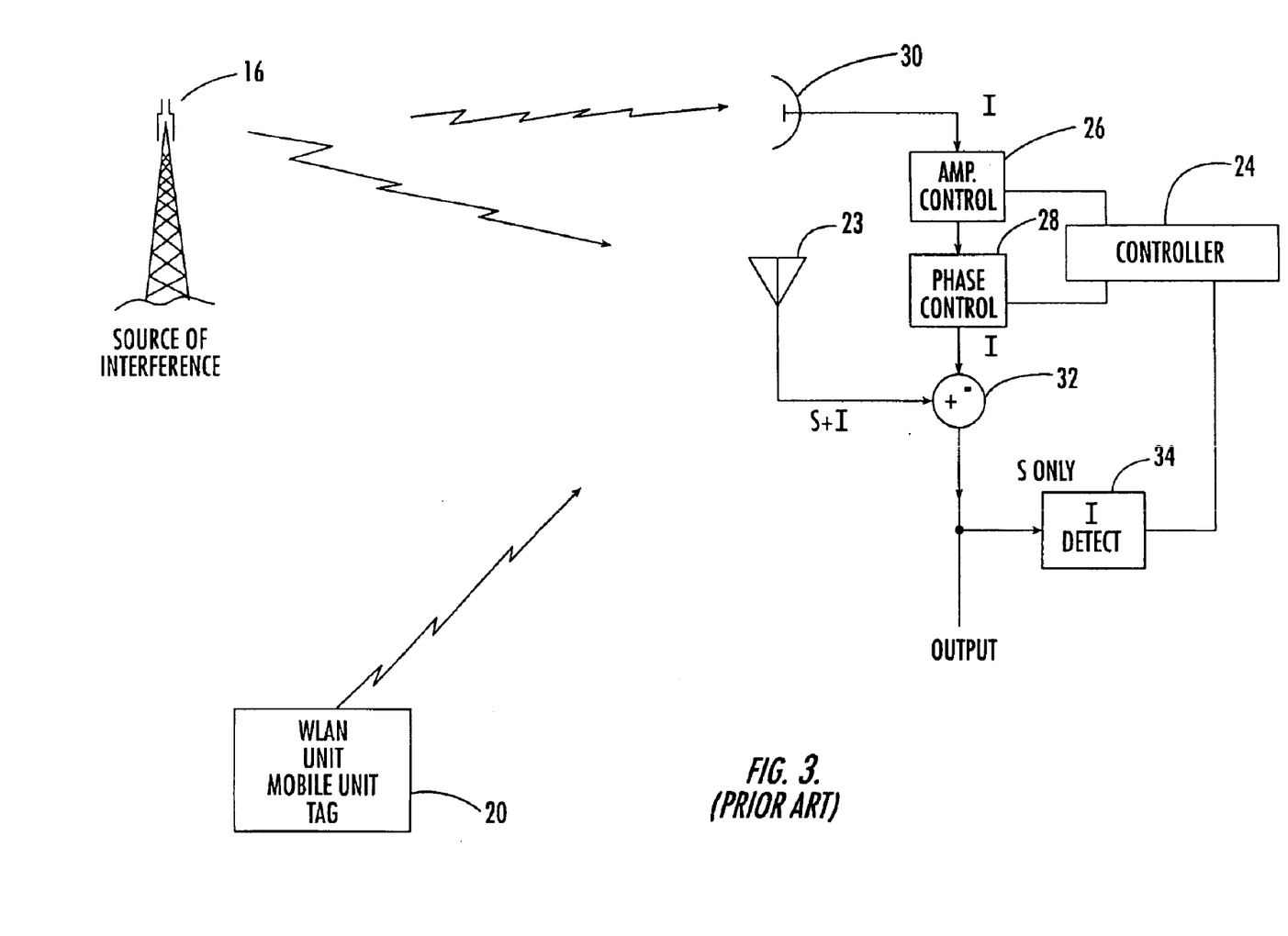
FIG. 3 is a system diagram showing a prior art approach used by many interference suppression systems where the interference (I) is subtracted from the contaminated but desired signal (S+I).

FIG. 3 illustrates a prior art interference reduction approach used in many interference suppression systems. The radio transmitter as a WLAN unit or tag 20 sends a signal that is received by a system antenna 23 and the best possible "interference" (I) is subtracted from a contaminated desired signal (S+I). A controller 24 is operative with an amplitude control circuit 26 and phase control circuit 28, which receive the interfering signal from an interference receiving antenna 30. A logic circuit 32 receives the (I) signal as an interference signal and the desired signal (S) plus the interference (I) and subtracts the interference. It is shown that the amplitude and phase of the interference can be controlled by minimizing the amount of interference in the output. An interference detection circuit 34 provides part of the feedback with the controller 24 for adjusting the amplitude control circuit 26 and the phase control circuit 28. The interference receiving antenna 30 can be a high gain antenna that has its beam directed at the source of interference.

This prior art solution is not effective when the interference signal would be disbursed in time, as happens in a real world reflective environment dominated by multipath effects. The present invention is effective to provide a solution in real time location systems (RTLS) and wireless local area networks.

In accordance with the present invention, phase-temporal interference suppression accommodates a wide variety of multipath distortion on the interference signal. When the interference signal is disbursed over time, disbursed over angle of arrival and of a random phase, the present invention provides a different solution as compared to what is described as the prior art of FIG. 3.

Figure 4:
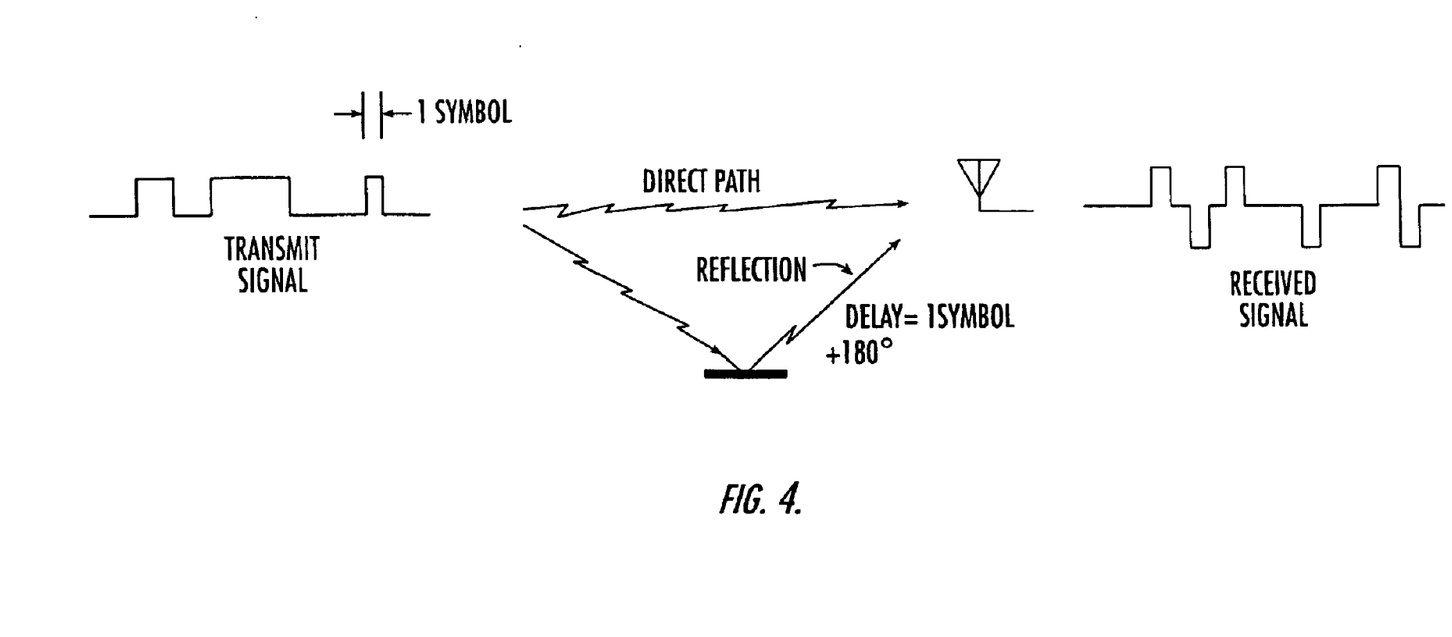
FIG. 4 is a graph of a signal illustrating how it can be changed with one reflection where the reflection is delayed one symbol time and the phase is 180° so that the two signals are subtracted.

FIG. 4 illustrates the importance of the present invention and how a signal can be changed with only one reflection. A transmit signal is shown as one symbol length and a direct signal path and a reflection signal path as reflected from a reflector is shown. In the example shown in FIG. 4, the reflection is delayed one symbol time and the phase is 180° such that the two signals are subtracted. The graphical representation of the signal result on the right illustrates the changed signal. Although only one signal reflection is shown, there could be hundreds of reflections. Also, the signal received a few wavelengths away in distance could have a totally different waveform depending on the nature of the reflections. To subtract any waveform from another waveform and obtain a complete subtraction, it is necessary to have identical signals so the negative of one signal algebraically cancels the other.

Figure 5:
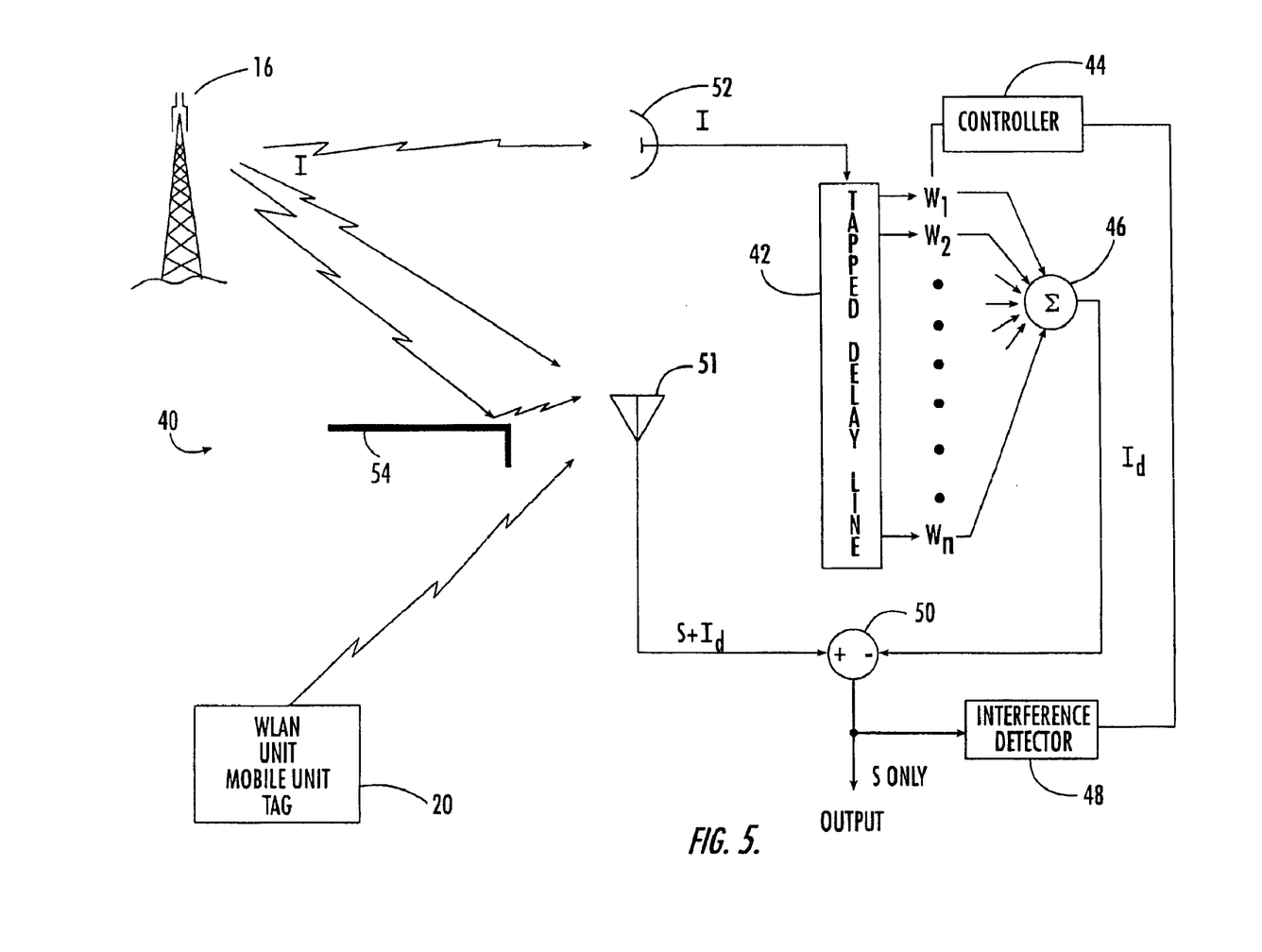
FIG. 5 is a system block diagram of the present invention showing the phase-temporal interference processing (PTIP) system for interference suppression using a tapped delay line, summer, interference detector and controller.

As shown in FIG. 5, the phase-temporal interference suppression technique of the present invention is used to accommodate the multipath distortion on the interfering signal. The system recreates a replica of the "disbursed interference," $I_D$ to effect a complete subtraction. As shown in the system 40 of the present invention, a tapped delay line 42, controller 44, summer 46, interference detector 48, logic circuit as an adder/subtracter 50, system antenna 51 and interference receiving antenna 52 are operative with each other. A source of interference 16 is shown as sending signals to the interference receiving antenna 50, and the system antenna 51 via a reflector 54. A radio transmitter 20, which could be a tag transmitter, mobile unit or mobile access point station of a WLAN system, also transmits a signal to the system antenna 51 that receives the desired signal plus the interference $I_D$. It is evident that the system of FIG. 5 recreates the signal interference no matter how it has been disbursed in time and phase (phase-temporal) and uses the recreated/disbursed version of the interference to complete cancellation of the interference on the system antenna.

The interference received at the system antenna 51 is different from the interference received at the interference receiving antenna 52. In one aspect of the present invention, the interference receiving antenna 52 is a high gain interference receiving antenna that creates the strongest signal possible by gathering as much energy as practical using an antenna of design known to those skilled in the art. Once the interference (I) is captured, it is changed to a replica of the disbursed interference $I_D$ received on the system antenna. The tapped delay line circuit 42 provides a tap-spacing (or resolution) that enables most of the symbol to be managed. One example would be on the order of one tapped symbol spacing on the taps.

Each possible delayed version of the interference is independently "weighted" by controlling its amplitude and phase by the functions $W_1, W_2 \ldots W_n$. The sum of all the weighted replicas can be made to a close approximation to the dispersed interference received at the system antenna 51. The control over the weight functions is managed by the controller 44 whose input is received from the interference detector 48. The control loop operates to minimize the amount of interference at the system output and supplies only S at the output. The interference is removed. Control can be used by techniques known to those skilled in the art. Although interference suppression techniques are known in television systems, such as disclosed in U.S. Pat. No. 5,818,517 to Hudson et al. and incorporated by reference, the present invention provides substantial improvement over prior art systems used in wireless and location systems.

It is possible that a high gain antenna for the interference receiving antenna 52 is not required under some circumstances. A replica of the interference signal could be received on an antenna that is identical and reasonably close in proximity to the "system antenna." Thus, the interference receiving antenna 52 could be replaced with a system antenna having two identical antennas.

Figure 6:
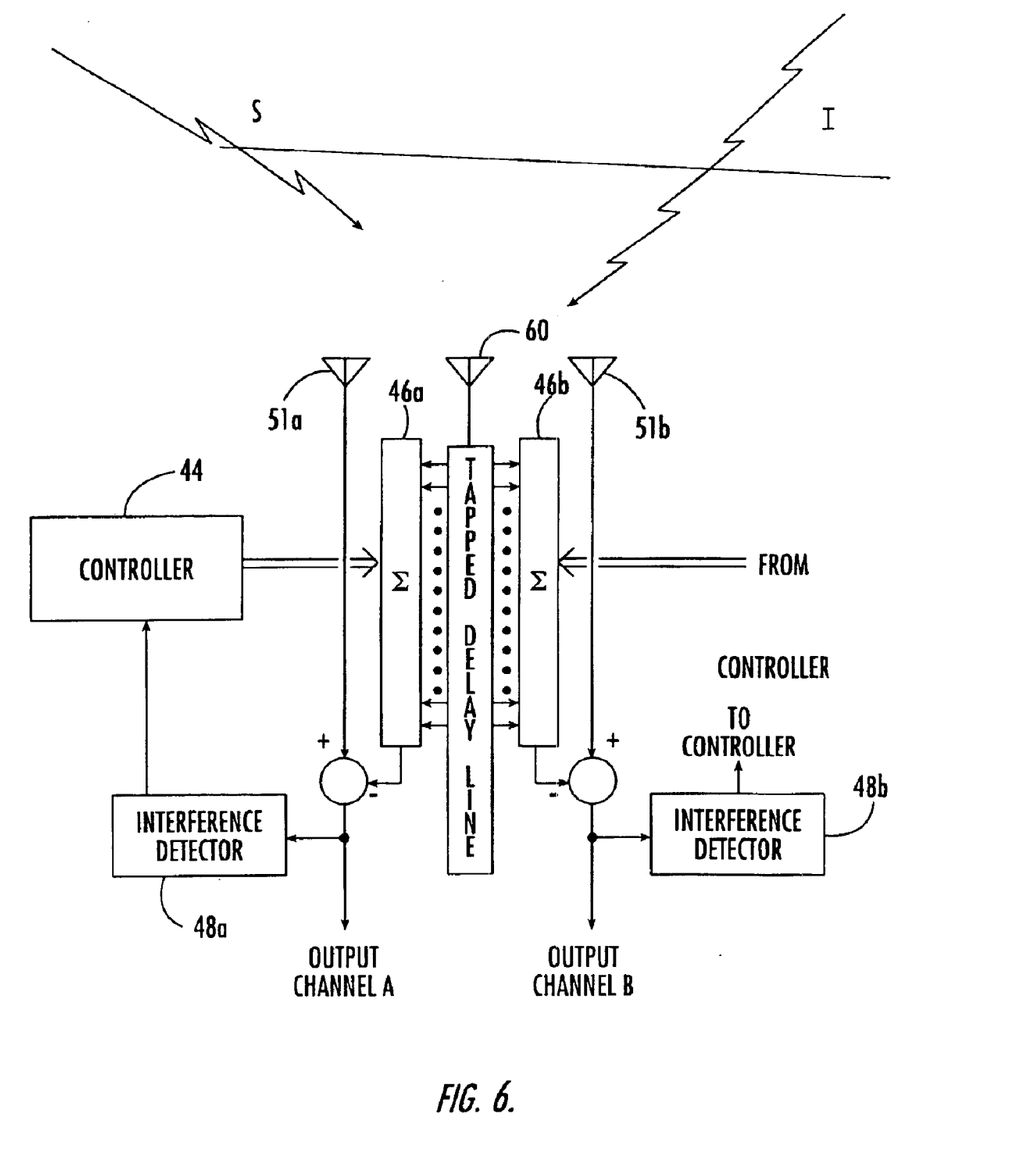
FIG. 6 is another system block diagram showing dual diversity antennae and a third input as a tertiary antenna where interference can be removed from both system inputs of channel A and channel B.

It is possible to use dual diversity for receiving the signal as disclosed in the incorporated by reference U.S. Pat. No. 5,995,046. For example, FIG. 6 illustrates a system where two system antennae 51a, 51b for channels A and B are illustrated. Two interference detectors 48a, 48b are used and a controller 44 is operative with two summers 46a, 46b that are operative with a tapped delay line 42 that is operative with a tertiary antenna 60. By use of the third input at a tertiary antenna 60, interference can be removed from both system inputs A and B. The summer 46a, 46b could contain both the weight manifold and summing manifold. Although the block diagram illustrates the basic signal flow, the system can be used with digital, RF or other analog systems.

Figure 7:
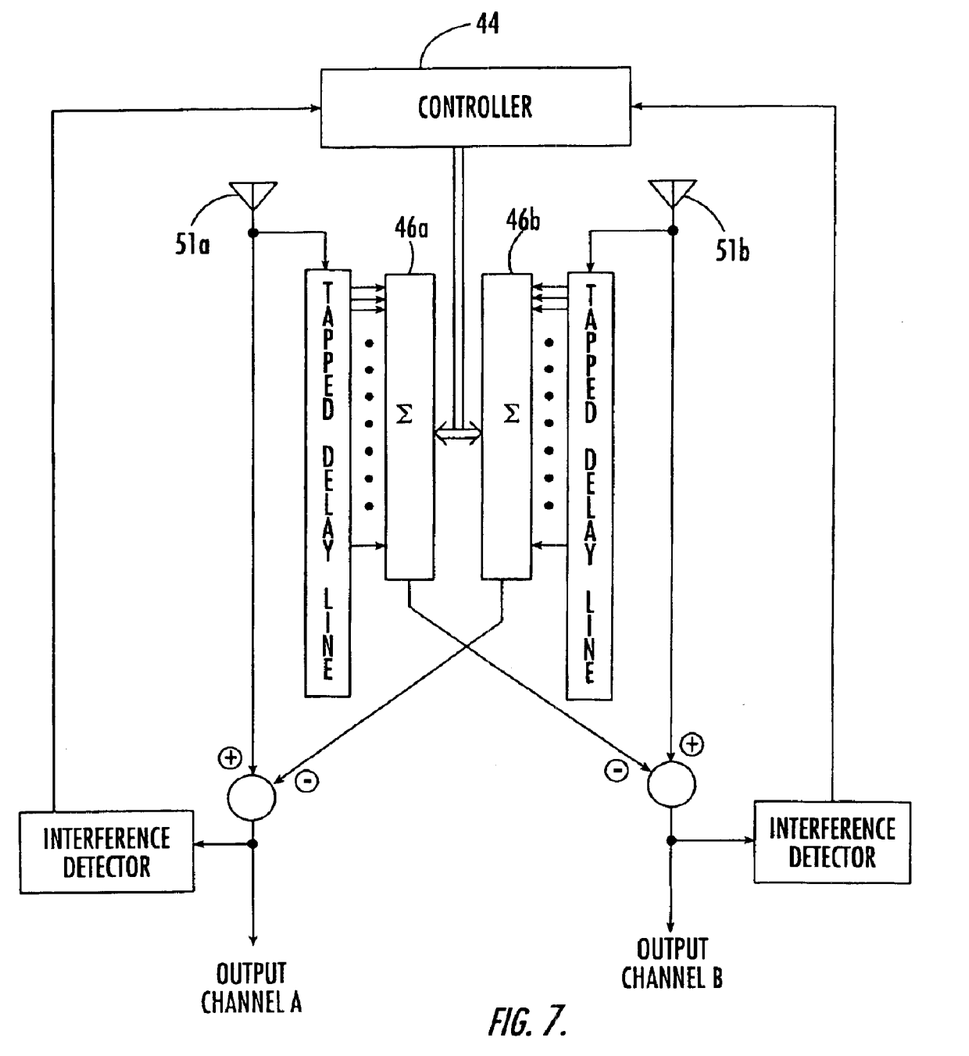
FIG. 7 is another system block diagram showing two diversity system antennae and a controller that operates to remove interference from each side by subtracting a replica interference from the other antenna in a bilateral, symmetrical fashion.

Another dual diversity systems with system antennas A and B is shown in FIG. 7 with two tapped delay lines 42a, 42b operative with summers 46a, 46b. The controller 44 operates to remove the interference from each side by subtracting a replica interference received from the other system antenna 51a or 51b in a bilateral symmetrical fashion to provide improved performance to both sides.

It is evident that the interference suppression system of the present invention provides interference reduction that is optimized for crowded wireless bands such as the 2.4 GHz band and the 5.0+ GHz bands in an environment dominated by multipath reflections. Of course, the technique can be applied to any frequency band, as known to those skilled in the art.

The use of the interference suppression system as described is operable with real time location systems (RTLS) and wireless local area networks (WLAN). It has the ability to increase co-channel use of the same frequency bands and improve the radio frequency mutual compatibility and enable these two systems to co-exist more effectively in the same frequency bands.

Figure 8:
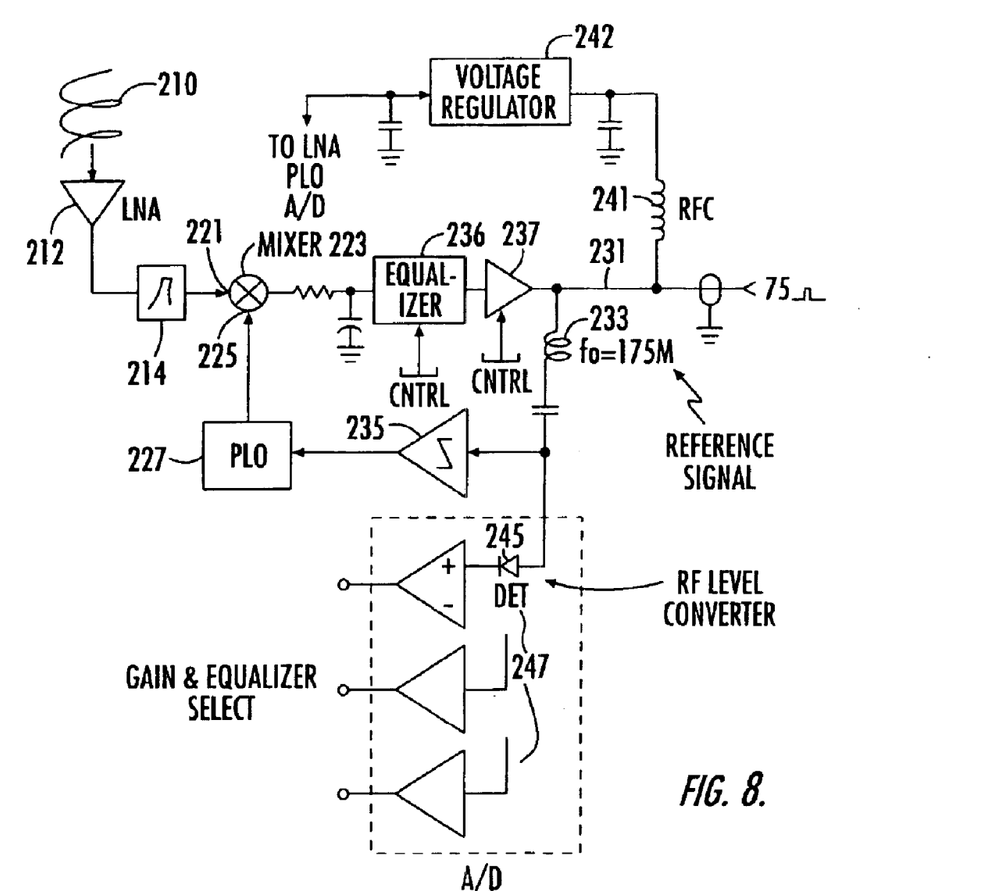
FIG. 8 is a high level block diagram of one example of the circuit architecture that can be used as part of a processor for determining first-to-arrive signals.
Figure 9:
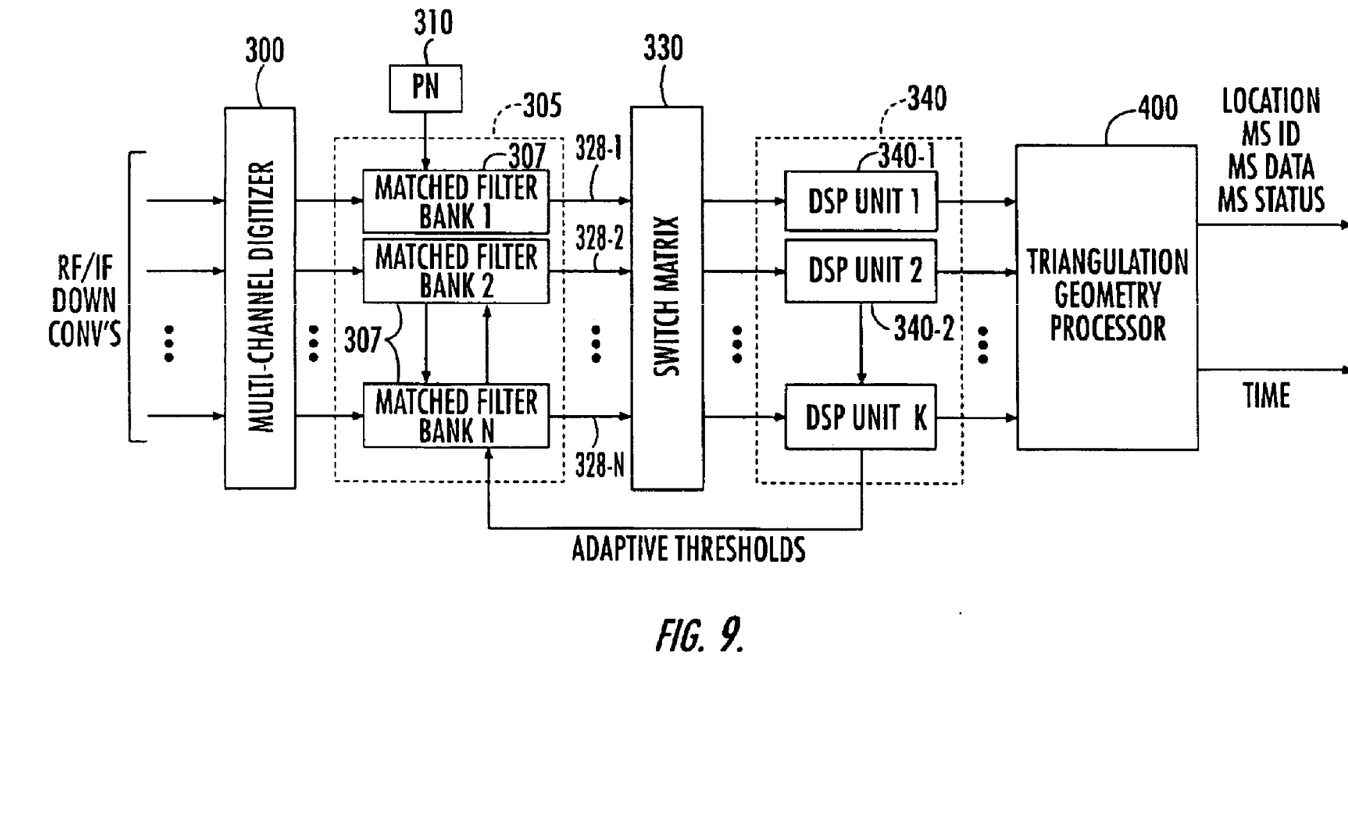
FIG. 9 is another high level block diagram of an example of the circuit architecture that can be used with the present invention for correlation-based RF signal processors.

As will now be described in detail, relative to FIGS. 1 and 1A and FIGS. 8 and 9, a location system as used with a wireless local area network and a tag location system (FIG. 1A) is described. FIGS. 8 and 9 show representative circuits and algorithms as also disclosed in the incorporated by reference patents that can be used with the present invention.

Figure 1:
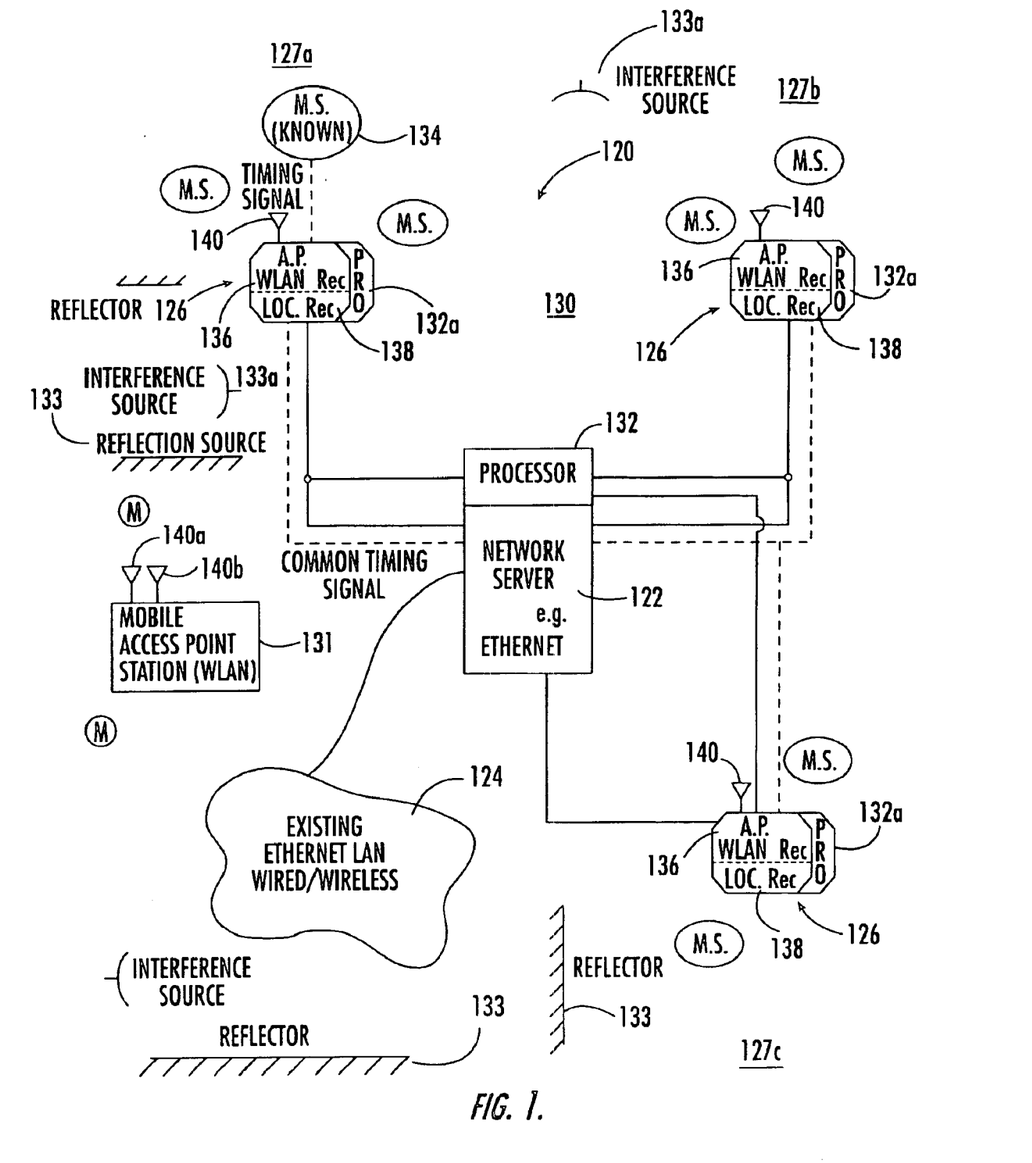
FIG. 1 is an overall system diagram of a wireless local area network and location system of the present invention.

FIG. 1 illustrates a high level block diagram of a WLAN system 120 and showing a network server 122 that is part of an ethernet local area network 124. A plurality of access point base stations 126 each define a cell (shown as 127a, 126b, 127c) as part of a wireless local area network 130 that communicates with wireless mobile stations (MS) using wireless communication signals that, in a preferred embodiment, are spread spectrum wireless communication signals. A single mobile access point station 131 is illustrated, although a plurality of such stations could be used in the system. Reflecting surfaces 133 are illustrated and usually are an annoying deterrent to the system. Another antenna 133a is an interference source.

A processor 132 is operatively connected to each of the access point base stations (both fixed and wireless) and operative to process communication signals transmitted from a mobile station and determine which signals are first-to-arrive signals, typically based on a common timing signal. A location processor conducts differentiation of the first-to-arrive signals to locate the mobile station. A processor 132a is incorporated with each access point base station in one aspect. A common timing signal can be applied to each access point base station (and to processor 132 and/or 132a) and could be provided by a wireless timing signal broadcast to each of the access point base stations, such as by a mobile station (MS) located at a known location 134 or an access point base station that provides the common timing signal. In yet another aspect of the present invention, a common timing signal can be supplied through a common bus, such as part of the ethernet structure.

Mobile and/or fixed access point base stations 126, 131 each have a wireless local area network (WLAN) receiver 136 for receiving communications signals. A separate location receiver 138 could be used for receiving separate location pulses. Processors 132 and/or 132a determine which signals are first-to-arrive signals and conduct differentiation of the first-to-arrive signals to locate the mobile station. The receiver 136 can operate from the same antenna 140 or can operate in dual diversity using two antennae 140a, 140b, as shown with the mobile access point station 131.

Each access point station could also include a plurality of mutually diverse antennas used in locating a mobile access point station or mobile station. In one aspect of the present invention, a communication signal could include a separate location packet or pulse. The location determination could occur by processing part of the normal data or by processing packets that are used specifically for locating the mobile access point station.

A communication signal transmitted from a mobile access point station 122 could include a spread spectrum location pulse appended to the wireless communication signal that could be of short duration, typically less than a one millisecond, spread spectrum transmission as a location pulse, which is distinct and different from the wireless local area network communication signal. This location pulse could be appended to the falling edge of the wireless communication signal or appended to the beginning or rising edge of the communication signal.

The mobile devices or stations in communication with a mobile access point station or mobile station could transmit location data as appended pulses as forth in the incorporated by reference copending patent application Ser. No. 09/997,282, filed Nov. 29, 2001. A mobile access point station could also add any signaling and location information as determined by those skilled in the art. Although direct sequence spread spectrum communication signals are preferred, different spread spectrum signals could be used, including any type of location pulse, frequency hopping, chirp or other spread spectrum signal techniques. Location transmitters and location receivers with appropriate communication circuitry, as set forth in the incorporated by reference patents and copending patent application, can be included as part of any mobile station or access point station as determined by those skilled in the art. It is also possible to use a network management station (MMS) operative under simple network management protocol (SNMP) and operative with a management information base (MIB). The positive characteristics for objects corresponding to access point stations and other devices associated with a wireless local area network system could allow management control by a network management station.

Figure 1A:
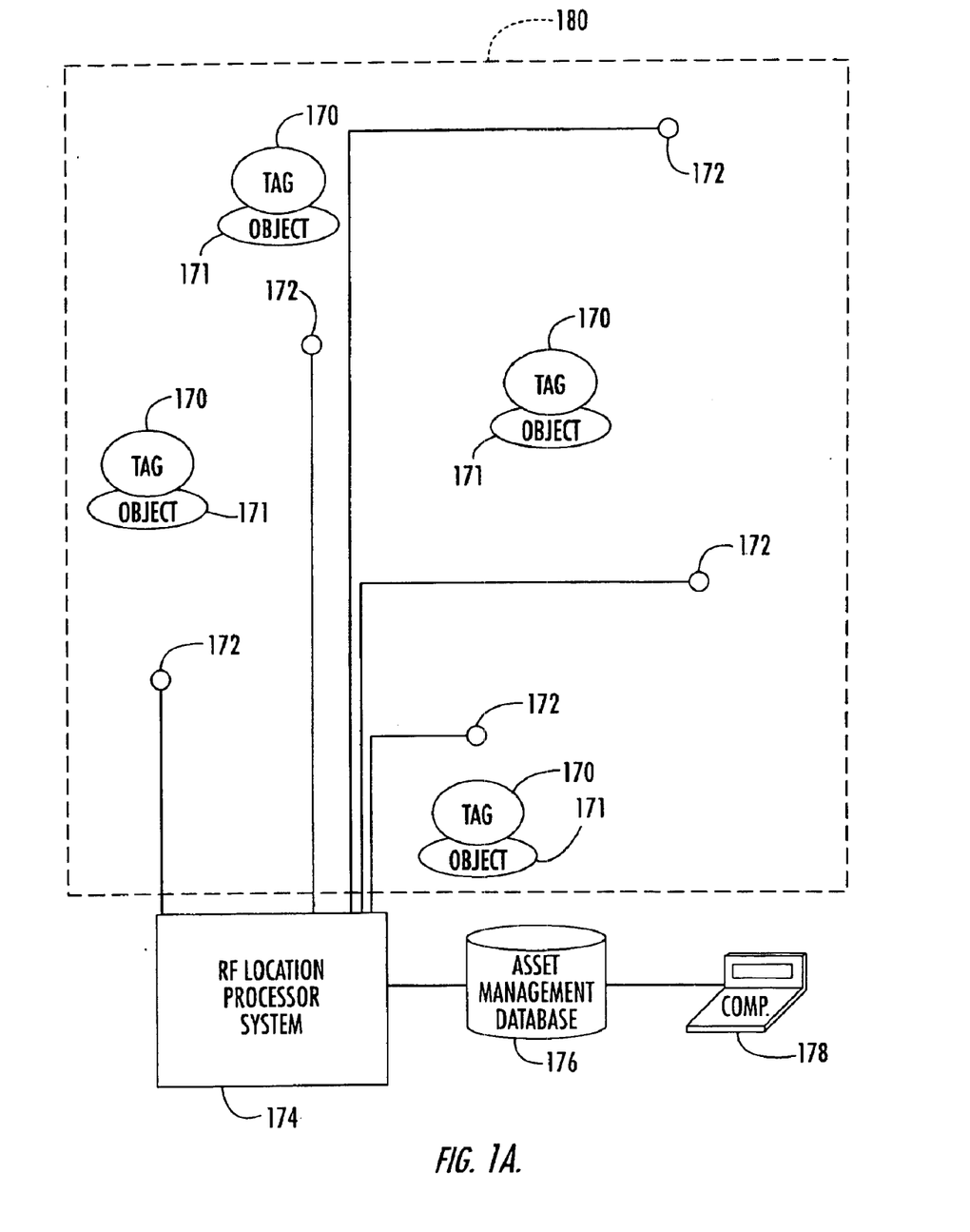
FIG. 1A is a system diagram showing the general architecture of a tagged object tracking and location system that is operative with the present invention.

FIG. 1A illustrates an environment where a plurality of tags 170 are associated with objects 171, such as items of inventory for manufactured objects in a factory corresponding to a monitored environment 180 as a non-limiting example. A plurality of spaced, monitoring receivers 172 receive signals from tag transmitters 170 and include processors (not shown in detail) for receiving the signals from the tag transmitters and determining which signals are first-to-arrive signals. These spaced monitoring receivers 172 are operative with an RF location processor system 174 to conduct differentiation of the first-to-arrive signals to locate an object and its associated tag 170. The processing system 174 is operative with an Asset Management Database 176 and computer 178 as described in the above-identified and incorporated by reference patents.

Referring now to FIGS. 8 and 9, a representative circuit and algorithm as described in the above mentioned and incorporated by reference patents are disclosed and set forth in the description below to aid in understanding the type of location system that can be used for determining which communication signals are first-to-arrive signals and how the processor conducts differentiation of the first-to-arrive signals to locate a mobile station, TAG, access unit or other device. This processor (or an associated processor) could also be operative as noted before for weighting the delayed versions of at least one interference signal by controlling amplitude and phase with weighted functions $W_1, W_2 \ldots W_n$ and summing weighted replicas to determine an approximation of the dispersed interference for cancelling interference.

FIG. 8 diagrammatically illustrates one type of circuitry configuration of a respective architecture for "reading" associated communication signals or a pulse (a "blink") used for location determination signals, such as signals emitted from a mobile station (M), a TAG, or a mobile access point station that is to be located. An antenna 210 senses appended transmission bursts or other signals from the mobile access point station to be located. The antenna in this aspect of the invention could also be omnidirectional and circularly polarized and coupled to a power amplifier 212, whose output is filtered by a bandpass filter 214. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and applied to communication cable 231 through a communication signal processor, which could be an associated processor as described before. The communication cable 231 also supplies DC power for the various components of the location receiver by way of an RF choke 241 to a voltage regulator 242, which supplies the requisite DC voltage for powering an oscillator, power amplifier and analog-to-digital units of the receiver.

The amplitude of the (175 MHZ) reference frequency supplied by the communications control processor to the phase locked local oscillator 227 implies the length of any communication cable 231 (if used) between a location processor and a receiver, such as if part of an access point station or other device. This magnitude information can be used as control inputs to equalizer 236 and current amplifier 237, so as to set gain and/or a desired value of equalization, that may be required to accommodate any length of a communication cable (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

FIG. 9 diagrammatically illustrates the architecture of a correlation-based, RF signal processor circuit as part of a processor to which the output of a respective RF/IF conversion circuit of FIG. 8 can be coupled for processing the output and determining location. The correlation-based RF signal processor correlates spread spectrum signals detected by an associated receiver with successively delayed or offset in time (by a fraction of a chip) spread spectrum reference signal patterns, and determines which spread spectrum signal received by a receiver of an access point station is the first-to-arrive corresponding to a location pulse or communications signal from the transmitter of a mobile access point station as part of the communications signal that has traveled over the closest observable path between a mobile access point station and the fixed location access point station or TAG and spaced monitoring receiver.

Because each receiver can be expected to receive multiple signals from the mobile access point station or other mobile device or TAG due to multipath effects caused by the signal transmitted by the mobile access point station or other device being reflected off various objects/surfaces between the mobile access point station and the receiver of other known access point stations 20, the correlation scheme ensures identification of the first observable transmission, which is the only signal containing valid timing information from which a true determination can be made of the distance from the station to the receiver.

For this purpose, as shown in FIG. 9, the RF processor employs a front end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by the PN spreading sequence generator of the location transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . , 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-$i$ of the set of digital signal processing units 340. The mobile access point station can "blink" or transmit location pulses randomly, and can be statistically quantified, and thus, the number of potential simultaneous signals over a processor revisit time could determine the number of such "on-demand" digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 uses a standard multi-lateration algorithm that relies upon time-of-arrival inputs from at least three detectors of the access point stations 20 or other devices to compute the location of the mobile access point station 22, or in other embodiments, locate a TAG or mobile station, such as a cellular phone, pager or other device. The algorithm may be one which uses a weighted average of the received signals. In addition to using the first observable signals to determine object location, the processor also can read any data read out of a memory for the mobile access point station (or mobile device or other device if applicable) and superimposed on the transmission. Object position and parameter data can be downloaded to a data base where object information is maintained. Any data stored in a mobile station memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multi-path effects, by using dual antennae (as shown generally with dual antennae 140*a*, 140*b* in FIG. 1) and providing spatial diversity-based mitigation of multipath signals. In such systems, the antennas of each location receiver at an access point station are spaced apart from one another by a distance that is sufficient to minimize destructive multipath interference at both antennas simultaneously, and also ensure that the antennas are close enough to one another so as to not significantly affect the calculation of the location of the object by the downstream multi-lateration processor.

The multi-lateration algorithm executed by the location processor 24 is modified to include a front end subroutine that selects the earlier-to-arrive outputs of each of the detector pairs as the value to be employed in the multi-lateration algorithm. A plurality of auxiliary "phased array" signal processing paths can be coupled to the antenna set (e.g., pair), in addition to the paths containing the directly connected receivers and their associated first arrival detectors that feed the triangulation locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference U.S. Pat. No. 6,127,976. This architecture can be configured to distribute the workload over a plurality of interconnected information handling and processing subsystems. Distributing the processing load enables fault tolerance through dynamic real-location.

The front end processing subsystem can be partitioned into a plurality of detection processors, so that data processing operations are distributed among sets of detection processors. The partitioned detection processors are coupled in turn through distributed association processors to multiple location processors. For mobile access point station (or mobile device) detection capability, each receiver could also be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a mobile device. The detection processor demodulates and time stamps all received energy that is correlated to known spreading codes of the transmission, so as to associate a received location pulse with only one mobile. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

The flow control mechanism uses an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual mobile access point station (or other mobile or location device) to a single destination location processor, the association communication process of the communication framework may employ the same information and processing load distribution algorithm executed by the detection communication process of the communication framework. Each location processor determines the geographical location of a mobile access point station (or other mobile or location device) using the time-of-arrival measurement information originally sourced from the detection processors. The specific algorithm employed for location determination matches the number of arrival time measurements with whatever a priori information is available.

To locate a mobile access point station (or other mobile device or TAG), a processor may employ all available diversity information associated with the mobile of interest, including, but not limited to the station ID (if any), any data contained in the transmission and metrics indicating confidence it these values. It then forwards a location report containing this information over a location communication process to an asset management data base. A location estimate may be derived from the measured time-of-arrival information in a received association report packet, using a differential time-of-arrival algorithm, such as a hyperbolic geometry-based function.

It is also possible to use a wireless local area network (WLAN) spread spectrum waveform to perform a geolocation function. The assumption is that the wireless communication signal, as a spread spectrum signal, has a high signal-to-noise ratio with reasonable power levels. The leading edge of this communication signal can be detected to a high accuracy and this information used with the algorithms as described before to provide relative time of arrival information for subsequent processing. It is possible to use edge detector circuitry as part of an access point station having a wireless local area network (WLAN) receiver. It is also possible to have a timing signal from a known location or unknown location. Other component locations could be known, of course. For example, some wireless local area network (WLAN) transmitters have known locations to enable the use of the algorithm when an access point station or other mobile station or device location is known.

It is also known that the communications signal as a spread spectrum communications signal can have sufficient bandwidth to provide useful time accuracy. For example, a 50 MHz bandwidth could provide approximately 5 nanoseconds of timing accuracy that is about 5 feet of accuracy using much of the technology and teachings described before. It is possible to use a correlator operative as a functional spread spectrum matched filter to enable a higher quality estimate with integration over many chips of the spread spectrum transmission. It is possible to use a matched filter that spans multiple symbols and improves accuracy by collecting more energy in the filter prior to leading edge detection.

It is evident that the present invention that uses the phase-temporal interference processing (PTIP) system for interference suppression is applicable to many different types of wireless local area networks and real time location systems. Although the described real time location system and wireless local area network described above are non-limiting examples, they are representative of the type of systems used with the present invention.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A wireless local area network system comprising:
   a plurality of access point stations that receive and transmit communication signals within a wireless local area network;
   a mobile station in communication with a plurality of access point stations;
   a processor operatively connected to each of the access point stations and operative for processing communication signals received from the mobile station and determining which communication signals are first-to-arrive signals and conducting differentiation of the first-to-arrive signals to locate a mobile station and weighting delayed versions of at least one interference signal by controlling amplitude and phase with weighted functions $W_1, W_2 \ldots W_n$, and summing any resultant weighted replicas to determine an approximation of the dispersed interference for cancelling interference.

2. A wireless local area network system according to claim 1, and further comprising an interference detector and controller circuit that provide a control loop for minimizing interference.

3. A wireless local area network system according to claim 1, and further comprising a system antenna and an interference receiving antenna directed for receiving an interference signal.

4. A wireless local area network system according to claim 3, and further comprising two system antennas spaced in diversity.

5. A wireless local area network system according to claim 1, and further comprising a processor positioned at each access point station for determining first-to-arrive signals and a location processor that receives any determined first-to-arrive signals from each access point station and conducts differentiation of said first-to-arrive signals.

6. A wireless local area network according to claim 1, wherein said mobile station comprises a mobile access point station that receives and transmits communication signals within the wireless local area network.

7. A wireless local area network according to claim 1, wherein said mobile station comprises a mobile device in communication with an access point station.

8. A wireless local area network according to claim 7, wherein said mobile device comprises a tag transmitter associated with an object.

9. A wireless local area network according to claim 1, wherein a processor is operative for determining first-to-arrive signals based on a common timing signal.

10. A wireless local area network system comprising:
    a plurality of access point stations that receive and transmit communication signals within the wireless local area network, said access point stations further comprising a system antenna and an interference receiving antenna directed for receiving an interference signal;
    a mobile station in communication with a plurality of access point stations;
    a processor operatively connected to each access point station for processing communication signals received from the mobile station and determining which communication signals are first-to-arrive signals and conducting differentiation of first-to-arrive signals to locate a mobile station;

a tapped delay line, summer, controller, and interference detector circuit operatively connected to said system and interference receiving antenna for weighting delayed versions of at least one interference signal by controlling amplitude and phase with weighting functions $W_1, W_2 \ldots W_n$, and summing any resultant weighted replicas to determine an approximation of the dispersed interference for cancelling interference.

11. A wireless local area network system according to claim 10, and further comprising two system antennas spaced in diversity.

12. A wireless local area network system according to claim 10, and further comprising a processor positioned at each access point station for determining first-to-arrive signals and a processor that receives any determined first-to-arrive signals from each access point station and conducting differentiation of said first-to-arrive signals.

13. A wireless local area network according to claim 10, wherein said mobile station comprises a mobile access point station that receives and transmits communication signals within the wireless local area network.

14. A wireless local area network system according to claim 10, wherein said mobile station comprises a mobile device in communication with an access point station.

15. A wireless local area network system according to claim 14, wherein said mobile device comprises a tag transmitter associated with an object.

16. A wireless local area network according to claim 10, wherein a processor is operative for determining first-to-arrive signals based on a common timing signal.

17. A location system for locating objects within a monitored environment comprising:

a tag transmitter associated with each object within the monitored environment and operative to transmit a signal encoded with information representative of the identification of the object;

a plurality of spaced monitoring receivers for receiving signals from tag transmitters; and a processor operative with each of said monitoring receivers for receiving and processing signals received from tag transmitters for determining which signals are first-to-arrive signals and conducting differentiation of the first-to-arrive signals to locate an object and associated tag and weighting delayed versions of at least one interference signal by controlling amplitude and phase with weighting functions $W_1, W_2, \ldots W_n$, and summing any resultant weighted replicas to determine an approximation of the dispersed interference for cancelling interference.

18. A location system according to claim 17, wherein a processor is operative for determining which signals are first-to-arrive signals based on a common timing signal.

19. A location system according to claim 17, and further comprising an interference detector and controller circuit that provide a control loop for minimizing interference.

20. A location system according to claim 17, and further comprising a system antenna and an interference receiving antenna directed for receiving an interference signal.

21. A location system according to claim 20, and further comprising two system antennas spaced in diversity.

22. A location system according to claim 17, and further comprising a processor positioned at each monitoring receiver for determining first-to-arrive signals and a location processor that receives any determined first-to-arrive signals from each monitoring receiver and conducting differentiation of said first-to-arrive signals.

23. A location system for locating objects within a monitored environment comprising:

a tag transmitter associated with each object within the monitored environment and operative to transmit a signal encoded with information representative of the identification of the object;

a plurality of spaced monitoring receivers for receiving signals from tag transmitters and each including a system antenna and interference receiving antenna;

a processor operative with each of said spaced monitoring receivers for receiving and processing signals received from tag transmitters for determining which signals are first-to-arrive signals and conducting differentiation of the first-to-arrive signals to locate an object and associated tag; and a tapped delay line, summer, controller and interference detector circuit operatively connected to said system antenna and interference receiving antenna for weighting delayed versions of at least one interference signal by controlling amplitude and phase with weighting functions $W_1, W_2 \ldots W_n$, and summing any resultant weighted replicas to determine an approximation of the dispersed interference for cancelling interference.

24. A location system according to claim 23, wherein a processor is operative for determining which signals are first-to-arrive signals based on a common timing signal.

25. A location system according to claim 23, and further comprising two system antennas spaced in diversity.

26. A location system according to claim 23, and further comprising a processor positioned at each monitoring receiver for determining first-to-arrive signals and a location processor that receives any determined first-to-arrive signals from each access point station and conducting differentiation of said first-to-arrive signals.

27. A wireless local area network system comprising:

a plurality of access point stations that receive and transmit communication signals within a wireless local area network;

a processor operatively connected to each of the access point stations and operative for processing communication signals received from a mobile station in communication therewith and determining first-to-arrive signals from a mobile station and conducting differentiation of the first-to-arrive signals for locating the mobile station and weighting delayed versions of at least one interference signal by controlling amplitude and phase with weighted functions $W_1, W_2 \ldots W_n$, and summing any resultant weighted replicas to determine an approximation of the dispersed interference for cancelling interference.

28. A wireless local area network system according to claim 27, and further comprising an interference detector and controller circuit that provide a control loop for minimizing the total amount of interference.

29. A wireless local area network system according to claim 27, and further comprising a system antenna and an interference receiving antenna directed for receiving an interference signal.

30. A wireless local area network system according to claim 29, and further comprising two system antennas spaced in diversity.

31. A wireless local area network according to claim 27, wherein said mobile station comprises a mobile access point station that receives and transmits communication signals within the wireless local area network.

32. A wireless local area network according to claim 27, wherein said mobile station comprises a mobile device in communication with an access point station.

33. A wireless local area network according to claim 27, wherein said mobile device comprises a tag transmitter associated with an object.

34. A wireless local area network system comprising:

a plurality of access point stations that receive and transmit communication signals within the wireless local area network from a mobile station in communication therewith;

said access point stations further comprising a system antenna and an interference receiving antenna directed for receiving an interference signal;

a tapped delay line, summer, controller and interference detector circuit operatively connected to said system and interference receiving antenna for weighting delayed versions of at least one interference signal by controlling amplitude and phase with weighting functions $W_1, W_2 \ldots W_n$, and summing any resultant weighted replicas to determine an approximation of the dispersed interference for cancelling interference.

35. A wireless local area network system according to claim 34, and further comprising two system antennas spaced in diversity.

* * * * *